United States Patent [19]

Koyanagi

[11] Patent Number: 4,674,532
[45] Date of Patent: Jun. 23, 1987

[54] CHECK VALVE

[76] Inventor: Toshimichi Koyanagi, 1-11-3, Taiheiji, Kashihara-shi, Osaka-fu, Japan

[21] Appl. No.: 793,029

[22] Filed: Oct. 30, 1985

[30] Foreign Application Priority Data

Oct. 30, 1984 [JP] Japan .................. 59-164306
Sep. 26, 1985 [JP] Japan .................. 60-147076

[51] Int. Cl.$^4$ .......................................... F16K 15/16
[52] U.S. Cl. .............................. 137/512.15; 137/849; 446/224
[58] Field of Search .......... 137/223, 846, 849, 512.15; 446/224

[56] References Cited

U.S. PATENT DOCUMENTS 2,954,048  9/1960  Rychlik ................ 137/512.15
3,312,237  4/1967  Mon .................... 137/512.15
3,448,766  6/1969  Schule ............. 137/512.15 X Primary Examiner—Robert G. Nilson
Attorney, Agent, or Firm—Larson & Taylor

[57] ABSTRACT

A check valve for a water bag, balloon toy, or the like, comprising a flat fluid pipe of plastic film open at its base end and its tip end. A flat valve body is disposed in the flat pipe and is closed along its lateral sides which are sealed to closed sides of the fluid pipe. The valve body is also closed at its side disposed towards the tip end of the fluid pipe but is open at its side disposed towards the base end of the fluid pipe. Fluid is able to flow inward in a direction from the tip end of the fluid pipe to the base end thereof through gaps between the inner surface of the fluid pipe and the outer surface of the valve body. However, fluid flow in the outward direction expands the valve body and closes the gaps to prevent outward flow.

6 Claims, 12 Drawing Figures

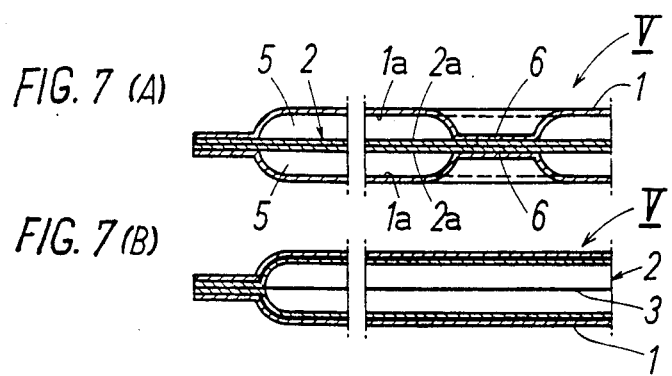
FIG. 7 (A)
FIG. 7 (B)
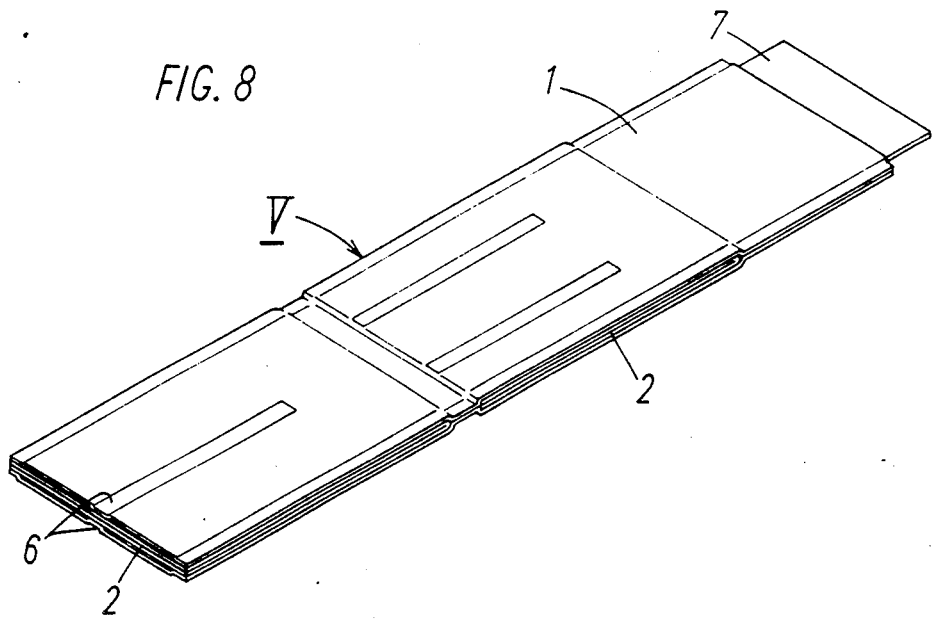
FIG. 8

CHECK VALVE

BACKGROUND OF THE INVENTION

In a water bag or a balloon toy made of a plastic film or rubber, a fluid such as gas or a liquid is conventionally sealed hermetically in various ways. In one way, a tube of a predetermined length extending from the main body of a water bag or a balloon toy, may be bound at its projecting portion after the main body has been filled with a fluid through the tube, thereby to prevent the fluid from leaking from the main body. In another way a check valve is mounted on a passage port of the main body. The sealing of the check valve prevents a fluid filled in the main body from leaking therefrom.

The former means not only requires a troublesome tube binding operaton, but also presents the defect that a portion of the fluid filled in the main body easily leaks during the tube binding operation. The latter means presents the defects that the valve itself has a very complicated structure and requires special structural members and much labor for attachment of the valve, resulting in expensive costs. Moreover, such valve may easily be damaged during the use, thereby to lower or lose the sealing function as a check valve.

SUMMARY OF THE INVENTION

The present invention relates to a check valve, and more particularly to improvements in a check valve to be used for an article such as a balloon toy or a water bag which is filled air-tight with a fluid such as air or a liquid.

It is a main object of the present invention to provide an economical check valve having a very simple structure capable of securely preventing a leak of a fluid filled in a balloon toy or a water bag and assuring a smooth charge/discharge of a fluid, so that the check valve of the present invention is less troubled and can easily be manufactured.

The check valve in accordance with the present invention comprises a suitable number of valve bodies disposed in a fluid pipe of a flat shape made of a plastic film, each of the valve bodies made of a flat plastic film pouch having a closed portion and an open portion formed respectively at its tip and base sides in the fluid flowing direction, a fluid adapted to be charged or discharged through gaps between the inner surfaces of the fluid pipe and the outer surfaces of the valve bodies.

The check valve in accordance with the present invention may be used for a balloon toy, for example. When a fluid is charged in the fluid pipe in a direction from the valve body closed portions to the valve body open portions, the fluid smoothly flows in the pipe through the gaps between the inner surfaces of the fluid pipe and the outer surfaces of the valve bodies, and enters the inside of the balloon toy. Since the valve bodies are closed at the tips thereof which form dead ends, the fluid filled in the balloon toy which tends to flow out due to its pressure, expands the valve bodies by the pressure of the fluid. The gaps are therefore closed to prevent the fluid from flowing out from the balloon toy.

The fluid filled in the balloon toy may smoothly be discharged by opening the closed gaps with a slender rod inserted therein from the closed sides thereof.

In accordance with the check valve of the present invention, its peculiar structure together with the resiliency of a thin material used may provide a secure non-return effect to prevent a fluid leak perfectly. Moreover, the check valve of the present invention do not have a complicated structure as done in a conventional check valve, thus eliminating a possibility of the occurrence of troubles. A fluid sealing effect can therefore be achieved for a long period of time.

BRIEF DESCRIPTION OF THE DRAWINGS

FIG. 7 (A) and (B) are views illustrating how the check valve operates; (A) is an enlarged section view of the check valve through which a fluid is introduced, and (B) is an enlarged section view of the check valve in a closed position.

FIG. 8 is a perspective view of check valve in accordance with a second embodiment of the present invention.

DETAILED DESCRIPTION OF THE INVENTION

Figure 1:
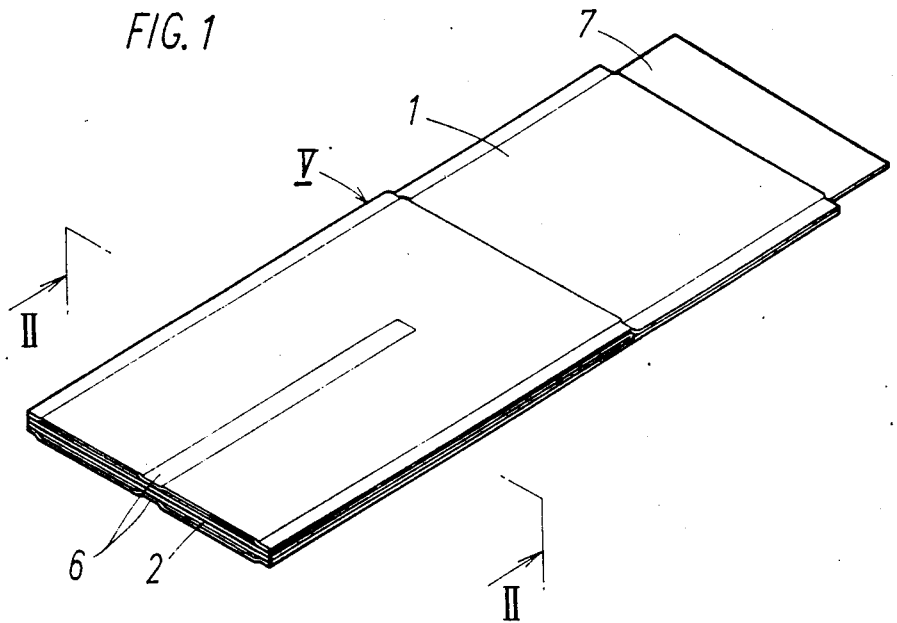
FIG. 1 is a perspective view of check valve in accordance with one embodiment of the present invention.
Figure 2:
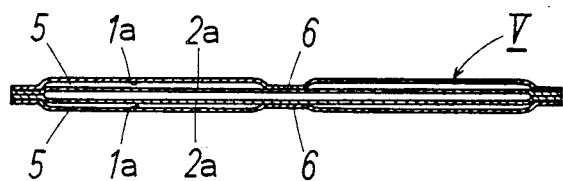
FIG. 2 is an enlarged section view taken along the line II—II of FIG. 1.

The check valve V in accordance with the present invention comprises a fluid pipe 1 of predetermined width and length formed into a flat shape and made of a soft and thin plastic film such as a polyethylene film, and a valve body 2 disposed in the fluid pipe along the fluid flowing direction from the base end side of the fluid pipe 1.

The valve body 2 has a closed portion 3 and an open portion 4 respectively at the tip and the base sides of the fluid pipe 1 in the fluid flowing direction. The valve body 2 is made of a flat plastic film pouch of which material is the same as that of the fluid pipe 1. Gaps 5 are formed between the inner surfaces 1a of the fluid pipe 1 and the outer surfaces 2a of the valve body 2. A fluid may flow in and out through these gaps 5.

In order to further assure the prevention of a fluid leak, the check valve V has a bonding portion 6 at which the inner surfaces 1a of the pipe 1 are bonded to the outer surfaces 2a of the valve body 2. The check valve V also has a guide tongue 7 for fluid charge/discharge means disposed at the fluid inlet/outlet port edge of the fluid pipe 1. This guide tongue 7 is disposed for facilitating the charge/discharge of a fluid.

Figure 3:
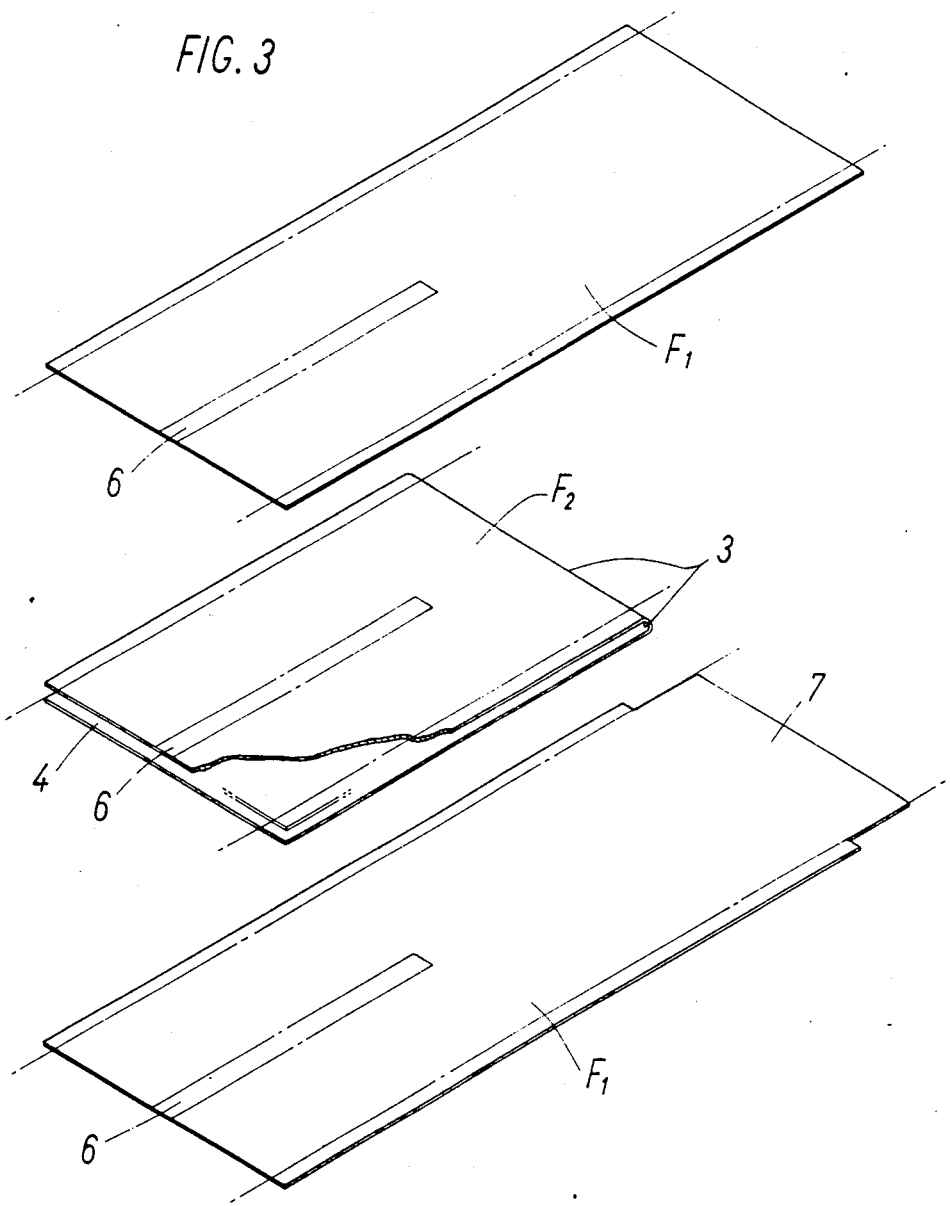
FIG. 3 is an exploded perspective view of the check valve of FIG. 1.
Figure 4:
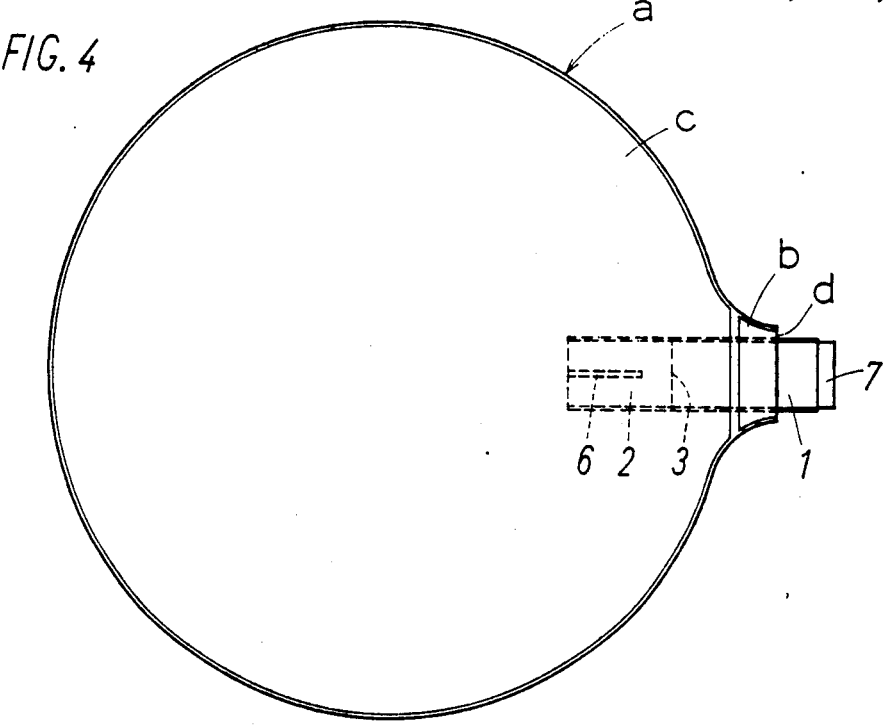
FIG. 4 is a front view illustrating one example of how the check valve of FIG. 1 is used.

FIG. 3 is an exploded view of the check valve V, from which it can easily be understood how the check valve V is made by way of example.

In this example, in order to facilitate the manufacture of the check valve having the structure above-mentioned, the fluid pipe 1 is made of two plastic films F1 and the valve body 2 is made of one plastic film F2 as folded.

The folded film F2 disposed along the fluid flowing direction is held by and between the films F1 and the both lateral sides of the films F1 and F2 are simultaneously heated and bonded to one another, thus forming a check valve having the structure above-mentioned.

The following description will discuss how the check valve V is used and operates with reference to FIGS. 4 to 7.

In FIGS. 4 to 7, a flat balloon toy body a is made of two plastic films c of a substantially circular shape each having a lip-like projecting portion b at a portion of the periphery thereof. These films c are bonded to each other at their peripheries, except the tip peripheries of the projecting portions b. The body a has an opening d at a portion of the periphery thereof.

Figure 5:
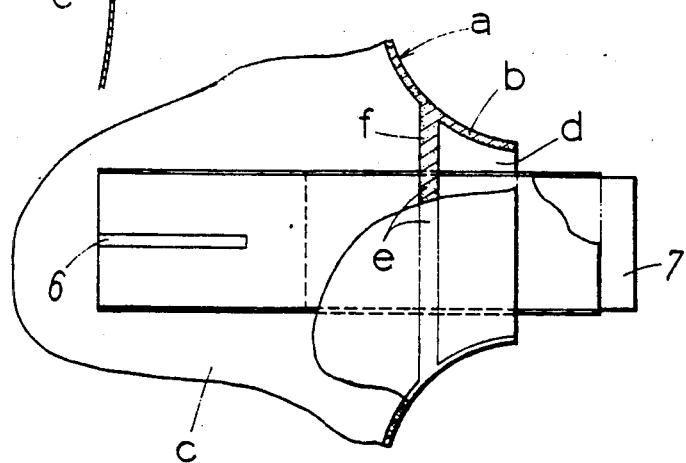
FIG. 5 is an enlarged view with portions broken away of the main portions in FIG. 4.

The check valve V can be inserted in the balloon toy body a through the opening d with the valve body mounting side of the check valve V turned to the inside of the balloon toy body a. The tip end of the fluid pipe 1 slightly projects from the projecting portion b of the main body a. As shown in FIG. 5, the outer peripheral surface of the check valve V is heatingly bonded, at one linear portion e thereof, to the inner surface of the opening d of the body a. The remaining inner surfaces of the opening d are heatingly bonded to one another at linear portions f thereof. There is thus formed a balloon toy of which the inside and the outside communicate with each other only through the check valve V.

Figure 6:
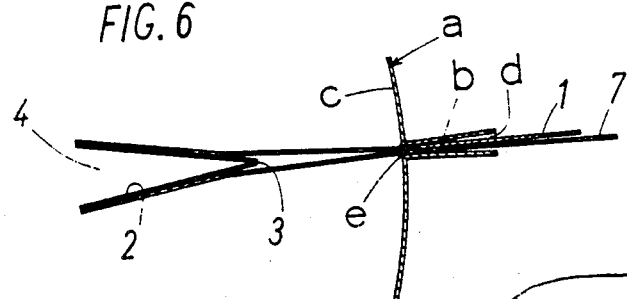
FIG. 6 is a view illustrating how the check valve effects a closing operation.

When blowing gas into the balloon toy constructed as above-mentioned, the guide tongue 7 of the fluid pipe 1 of the check valve V can be used. That is, the tip of a supply port of a gas supply means ( not shown ) can easily be inserted into the fluid pipe 1. When gas is then supplied, the gas is smoothly charged into the body a through the gaps 5 as shown in FIG. 7 (A). Upon the completion of such gas supply, the gas supply means is removed. Since the valve body 2 has at its tip the closed portion 3 which forms a dead end, the fluid filled in the balloon toy which tends to flow out, expands the valve body 2 by the pressure of the fluid. The gaps 5 are therefore closed to prevent the fluid from flowing out from the balloon toy, as shown in FIG. 6 and FIG. 7 (B).

For discharging gas once charged in the body a, the gaps 5 can be pressingly opened by inserting a slender rod or the like into the gaps 5 from the closed side of the valve body. A smooth discharge of the gas is thus achieved.

Even if the gaps 5 should insufficiently be sealed to allow a portion of gas to leak outside, the pressure of the gas acts on the fluid pipe 1 at its bonded portion e of the outer surface thereof to close tight the fluid pipe 1. Thus, gas leakage can securely be prevented in two stages.

According to this embodiment of the present invention, the inner surfaces of the fluid pipe 1 and the outer surfaces of the valve body 2 are partially bonded to one another to narrow the width of the gaps 5, thereby to further improve the prevention of a fluid leak.

The following description will discuss a second embodiment of the present invention with reference to FIGS. 8 to 11.

In the second embodiment, a plurality of valve bodies 2 are used and the inner surfaces 1a of the fluid pipe 1 and the outer surfaces 2a of the valve bodies 2 are bonded to one another at one portion at the base side and at a plurality of portions in a widthwise direction halfway of the fluid pipe 1, thereby to form a plurality of bonded portions 6. Except these two points above-mentioned, the second embodiment is the same in structure as the first embodiment.

Two valve bodies 2 are disposed in series in the fluid pipe 1 along the fluid flowing direction from the base side of the fluid pipe 1.

Figure 9:
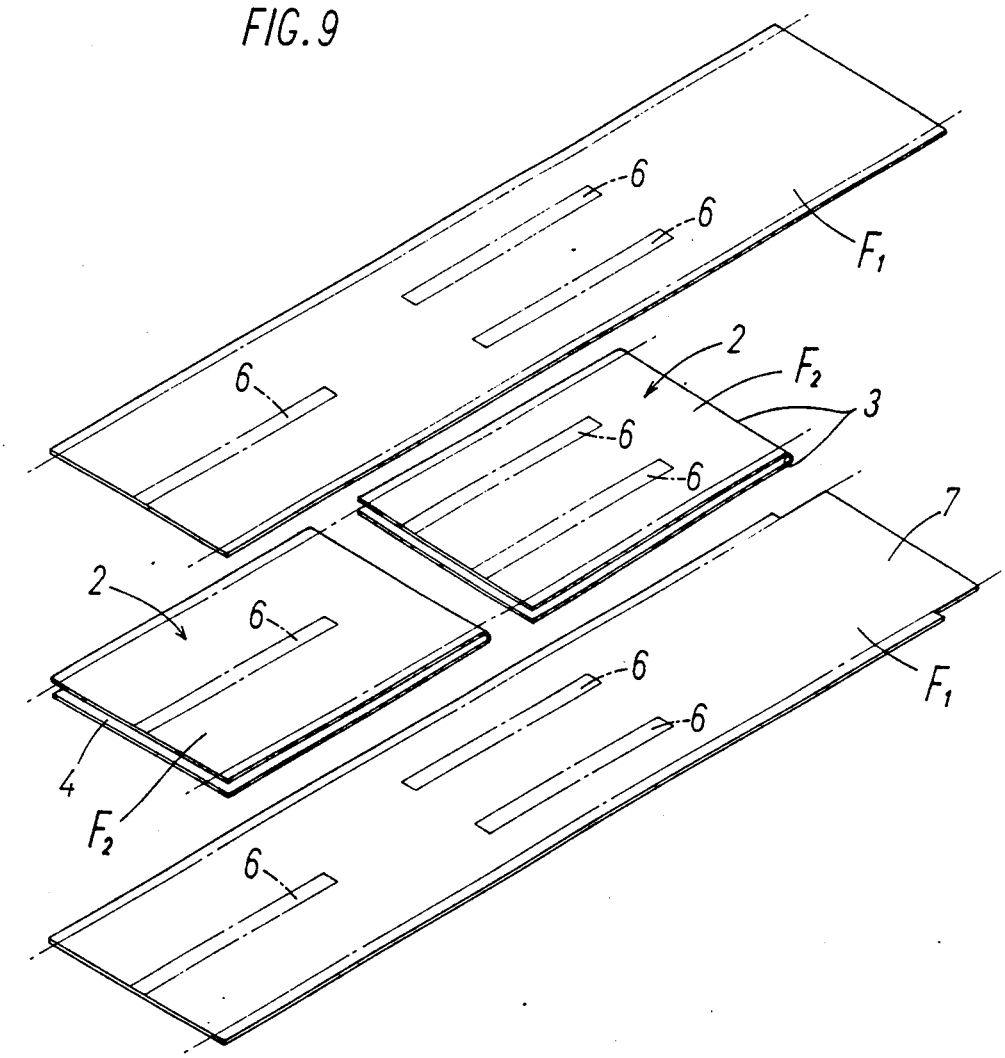
FIG. 9 is an exploded perspective view of the check valve in FIG. 8.

FIG. 9 is an exploded view of the check valve, from which it can easily be understood how the check valve is made by way of example.

Figure 10:
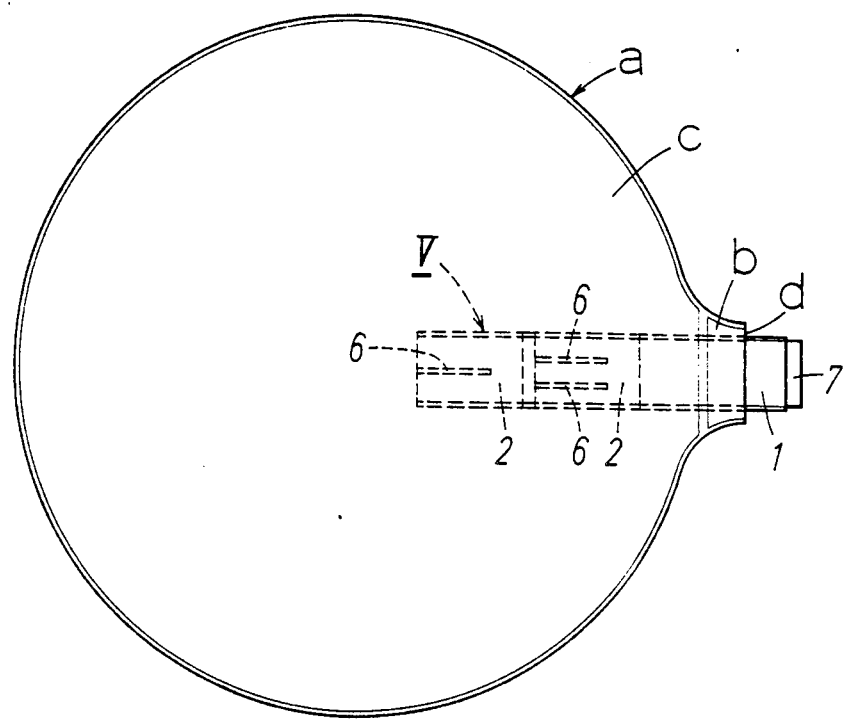
FIG. 10 is a front view illustrating one example of how the check valve of FIG. 8 is used.
Figure 11:
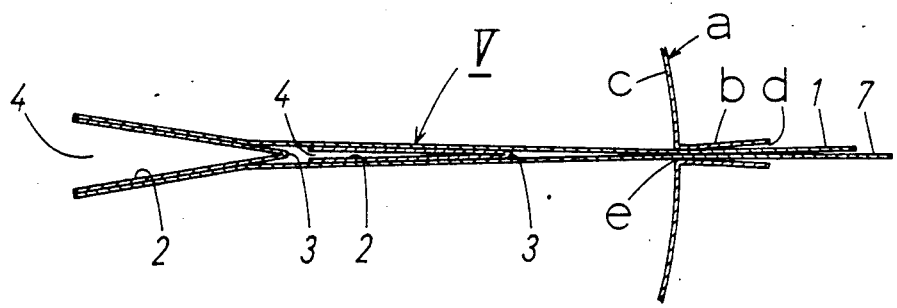
FIG. 11 is a view illustrating how the check valve effects a closing operation.

The check valve V of the second embodiment can be used in a balloon toy body a as shown in FIGS. 10 and 11. Since each of the valve bodies 2 has at its tip a closed portion 3 which forms a dead end, a fluid filled in the balloon toy which tends to flow out, expands the valve body 2 at the base side by the pressure of the fluid. The gaps 5 are therefore closed to prevent the fluid from flowing out from the balloon toy. At this time, even if a portion of the gas passes through the gaps 5, the other valve body 2 prevents such portion of the gas from flowing out. Together with the provision of a plurality of bonded portions 6, such structure further prevents securely the gas in the balloon toy from flowing out.

Preferred embodiments of the present invention has been discussed and illustrated only by way of example. The present invention is therefore not limited to these embodiments. All modifications and variations of the present invention are included in the present invention without departing from the scope of the attached claims.

What we claim is:

1. A check valve comprising:
   a fluid pipe formed in a flat shape, said fluid pipe being closed its sides, open at its base end and its tip end and being made of plastic film;
   at least one valve body, each of said valve bodies being made of plastic film, said valve being formed as a flat pouch closed along its lateral sides, said closed lateral sides being sealed to the closed sides of said fluid pipe, said flat pouch also being closed along its side disposed towards said tip end of said fluid pipe and being open along its side disposed towards said base end of said fluid pipe, whereby fluid is able to flow through said fluid pipe in an inward flow direction from said tip end to said base end through gaps between the inner surfaces of said fluid pipe and the outer surfaces of said valve body and whereby fluid flow in an outward flow direction from said base end towards said tip end of said fluid pipe expands said valve body and closes said gaps to prevent fluid flow in said outward flow direction.

2. A check valve as set forth in claim 1, wherein said valve body is disposed in the fluid pipe.

3. A check valve as set forth in claim 1, wherein a plurality of valve bodies are disposed in series in the fluid pipe.

4. A check valve as set forth in claim 1 wherein the inner surfaces of the fluid pipe are partially bonded to the outer surfaces of the valve bodies.

5. A check valve as set forth in claim 4 wherein the inner surfaces of the fluid pipe are partially bonded to the outer surfaces of the valve bodies at one portion of each of said valve bodies.

6. A check valve as set forth in claim 4, wherein the inner surfaces of the fluid pipe are partially bonded to the outer sufaces of the valve bodies at a plurality of portions in the widthwise direction of each of said valve bodies.

* * * * *